United States Patent [19]

Camera et al.

[11] 4,150,327
[45] Apr. 17, 1979

[54] AUTOMATIC CONTROL OF PRODUCTION MACHINING BY A MACHINE TOOL

[75] Inventors: Antonino Camera; Alirio Dapiran; Gianluigi Divia', all of Turin, Italy

[73] Assignee: Instituto per le Ricerche di Tecnologia Meccanica RTM, Turin, Italy

[21] Appl. No.: 839,474

[22] Filed: Oct. 4, 1977

Related U.S. Application Data

[63] Continuation-in-part of Ser. No. 741,434.

[30] Foreign Application Priority Data

Nov. 19, 1975 [IT] Italy .............................. 69855 A/75

[51] Int. Cl.² ............................................. G05B 19/24
[52] U.S. Cl. ..................................... 318/568; 318/39; 318/571
[58] Field of Search ......................... 318/39, 571, 568

[56] References Cited

U.S. PATENT DOCUMENTS

| | | | |
|---|---|---|---|
| 3,629,558 | 12/1971 | Coggin | 318/568 |
| 3,934,186 | 1/1976 | Hayakawa et al. | 318/568 X |
| 4,025,838 | 5/1977 | Watanabe | 318/568 |
| 4,068,155 | 1/1978 | Robbins et al. | 318/568 |

Primary Examiner—B. Dobeck
Attorney, Agent, or Firm—Sughrue, Rothwell, Mion, Zinn and Macpeak

[57] ABSTRACT

Automatic control of the machining process of a series of workpieces is effected by a computer-controlled machine tool in which the feed speed of a cutting tool is controlled automatically according to a program determined in a preliminary teaching mode in which a sample workpiece is machined by a cutting tool advancing at a constant spaced speed and in which signals representing working torque on the tool for different positions of the tool relative to the workpiece, modified to take into account cutting characteristics, are stored in a memory. During a subsequent adaptive cutting mode the tool feed speed for machining successive workpieces of a series is determined by processing reference signals extracted from the memory with signals representing the actual thickness of the stock to be machined to generate a signal controlling the instantaneous rate of tool advance, taking into account tool wear parameters.

8 Claims, 5 Drawing Figures

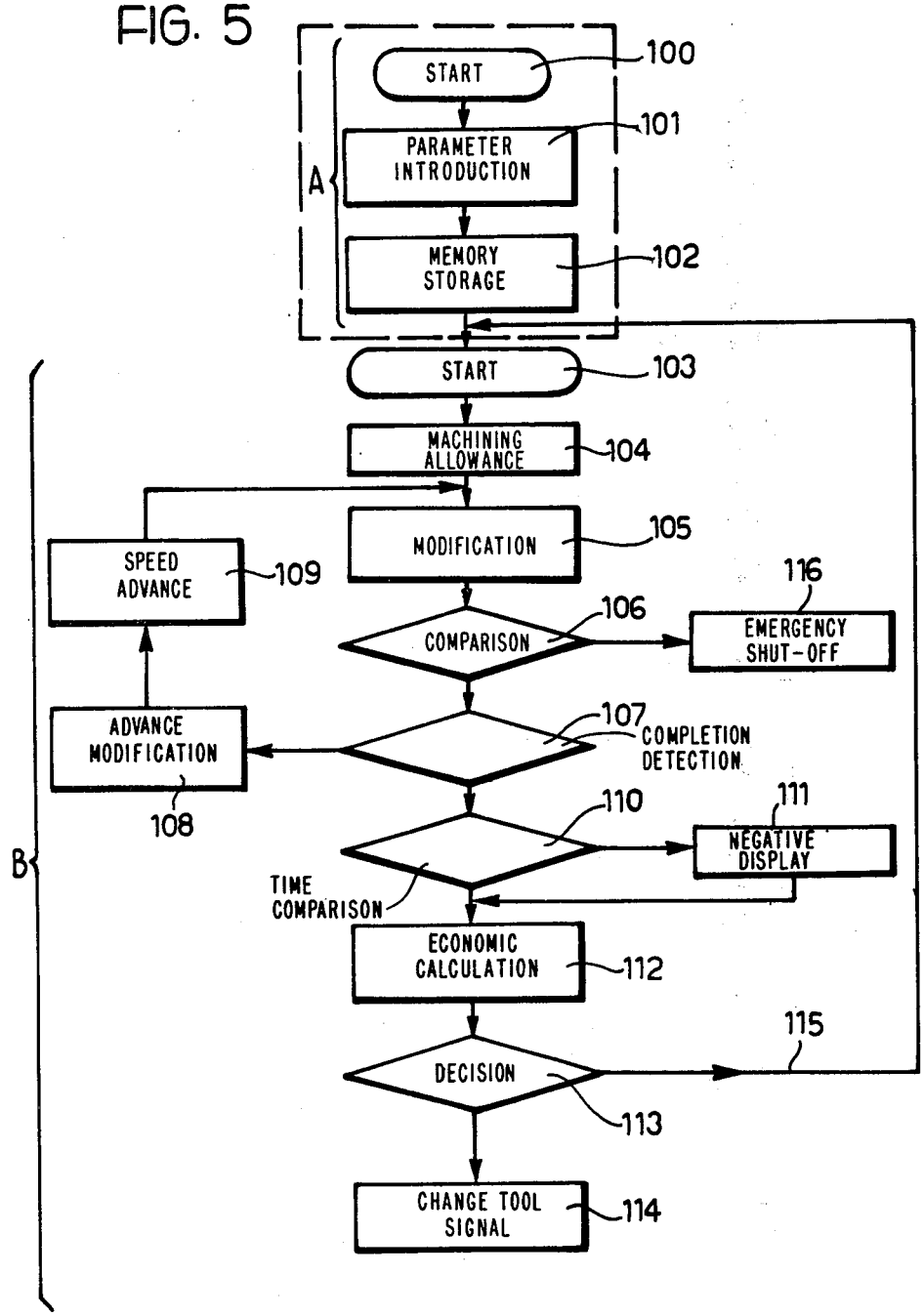

AUTOMATIC CONTROL OF PRODUCTION MACHINING BY A MACHINE TOOL

This application is a continuation-in-part of U.S. Application Ser. No. 741,434 filed Nov. 12, 1975 now abandoned.

BACKGROUND OF THE INVENTION

This invention relates to a method for the automatic control of machining process, in particular the cutting by means of a machine tool of a series of workpieces having surfaces of different characteristics to be machined by variation of the feed speed of a cutting tool of the machine tool from workpiece to workpiece.

More particularly the invention concerns processes of said type which make use of variables which affect the cost of the workpiece in adapting automatically the feed speed of the cutting tool to prevailing conditions, including the cutting efficiency of the tool, variation of the depth of cut, variation of the area of the surface being machined and of the hardness of the workpiece material.

The main object of the invention is to provide a process for controlling a machine tool to allow the optimum use of the tool, taking into account, in addition to the abovementioned variables, specific economic considerations; in particular the invention seeks to provide a method in which an increase in the depth of cut within the working limits of the machine, along a workpiece surface which is being machined does not lead to an increase in the machining time.

Processes are known for the control of production machining, by means of machine tools, of a series of workpieces in which the temperature of the cutting region is measured and in which the state of wear of the cutting tool is also monitored constantly, these two parameters being utilized in the automatic control of the cutting speed of the tool. Such known processes serve to reduce the cutting speed with time so that the temperature of the cutting region remains substantially constant and the tool wear does not exceed predetermined limits.

The fundamental disadvantage of such processes lies in the fact that the measurement of the temperature in the cutting region is particularly complicated and difficult. In fact, this temperature is influenced by the mass flow of coolant, the form of cuttings produced and by variations in the conditions of contact between the cutting tool and the workpiece, which in turn depend on the type of tool and which vary with each sharpening of the tool. The temperature in the cutting region therefore undergoes considerable variations even over very short periods, and in practice the temperature measurements will be limited to the mean temperature over a period and the mean temperature of an area of the workpiece of excessive dimensions.

Another known process for controlling the operation of a machine tool entails measuring the working torque applied by a cutting tool to the workpiece, the power applied to the tool and the deflection to which the tool is subjected during working. In such a process the quantities which are controlled are the cutting speed and the advance feed speed of the tool. The controlled quantities are tied to quantities measured by rather complicated predetermined equations. Control of the cutting speed and of the feed speed of the tool is effected by an analog computer which solves the said equations. This process suffers from fundamental disadvantage of using electronic apparatus and specially programmed measuring instruments which are both very complex and costly.

SUMMARY OF THE INVENTION

In order to avoid the aforementioned disadvantages the present invention provides a process for control of the cutting, by means of a machine tool, of a series of workpieces having surfaces of different characteristics to be machined by variation of the feed speed of a cutting tool of the machine tool, comprising a teaching mode carried out on at least one sample workpiece, followed by an adaptive cutting mode, carried out on each of the workpieces of the series, wherein the teaching mode comprises the operations of:

(a) subjecting at least one sample workpiece to cutting by means of the machine tool with the cutting tool advancing at a constant feed speed;

(b) generating a first signal C proportional to the working torque of the cutting tool;

(c) generating a second signal Q proportional to the depth of cut along the whole of the sample workpiece;

(d) processing the first and second signals C, Q to provide a third signal C represented by:

$$C = C^{k_1} \cdot k_2 \cdot Q.$$

where $K_1$ is a constant which is predetermined according to the technological characteristics of the cutting tool, the material of the workpiece to be machined and the cutting conditions, and $k_2$ is a constant which is predetermined according to the number of cutting edges of the cutting tool;

(e) generating a fourth signal P which is a function of the relative position of sample workpiece and the cutting tool;

(f) storing in a memory progressive values of the third signal C as a function of the relative positions of sample workpiece and the cutting tool;

and wherein the cutting mode comprises the operations of:

(g) generating a fifth signal $P_i$ representing the instantaneous relative position of the workpiece and the cutting tool;

(h) extracting the third signal C, stored during the teaching mode and corresponding to the instantaneous relative position between the workpiece and the tool, and generating a sixth reference signal $C'_m$ proportional to said extracted third signal;

(i) generating a seventh signal $S_i$ proportional to the actual depth of cut along the workpiece surface to be machined by the cutting tool;

(j) generating an eighth signal $C_a$ having a predetermined constant value, representative of an additive value of torque;

(k) processing the sixth signal $C'_m$, the seventh signal $S_i$ and the eighth signal $C_a$ to generate a ninth signal $C_c$ represented by:

$$[C_c = C'_m \cdot k_3 + C_a] \cdot S_i,$$

where $k_3$ is a predetermined constant proportional to the ratio, derived experimentally, between the cutting forces of a new tool and the cutting forces of the same tool at the end of its working life;

(l) generating a tenth signal $C_i$ proportional to the instantaneous working torque of the cutting tool;

(m) processing the ninth signal $C_c$ and the tenth signal $C_i$ to generate an eleventh signal $\Delta a$ represented by:

$$\Delta a = \left( \frac{C_c - C_i}{k_4 \cdot C_i} \right)^{k_5}$$

where $k_4$ is a corrective constant which is predetermined so as to optimize the response rate of the machine tool control system, and $k_5$ is a constant which is predetermined according to the technological characteristics of the cutting tools, the material of the workpieces and the cutting conditions, and (n) controlling the feed speed of the cutting tool by means of the said eleventh signal $\Delta a$.

BRIEF DESCRIPTION OF THE DRAWINGS

The invention will now be described by way of non-limiting example, with reference to the accompanying drawings, wherein:

FIG. 5 is a logical flow diagram illustrating a program for a computer cooperating with the machine tool of FIG. 1 controlled by the process of this invention.

DESCRIPTION OF THE ILLUSTRATED EMBODIMENT OF THE INVENTION

Figure 1:
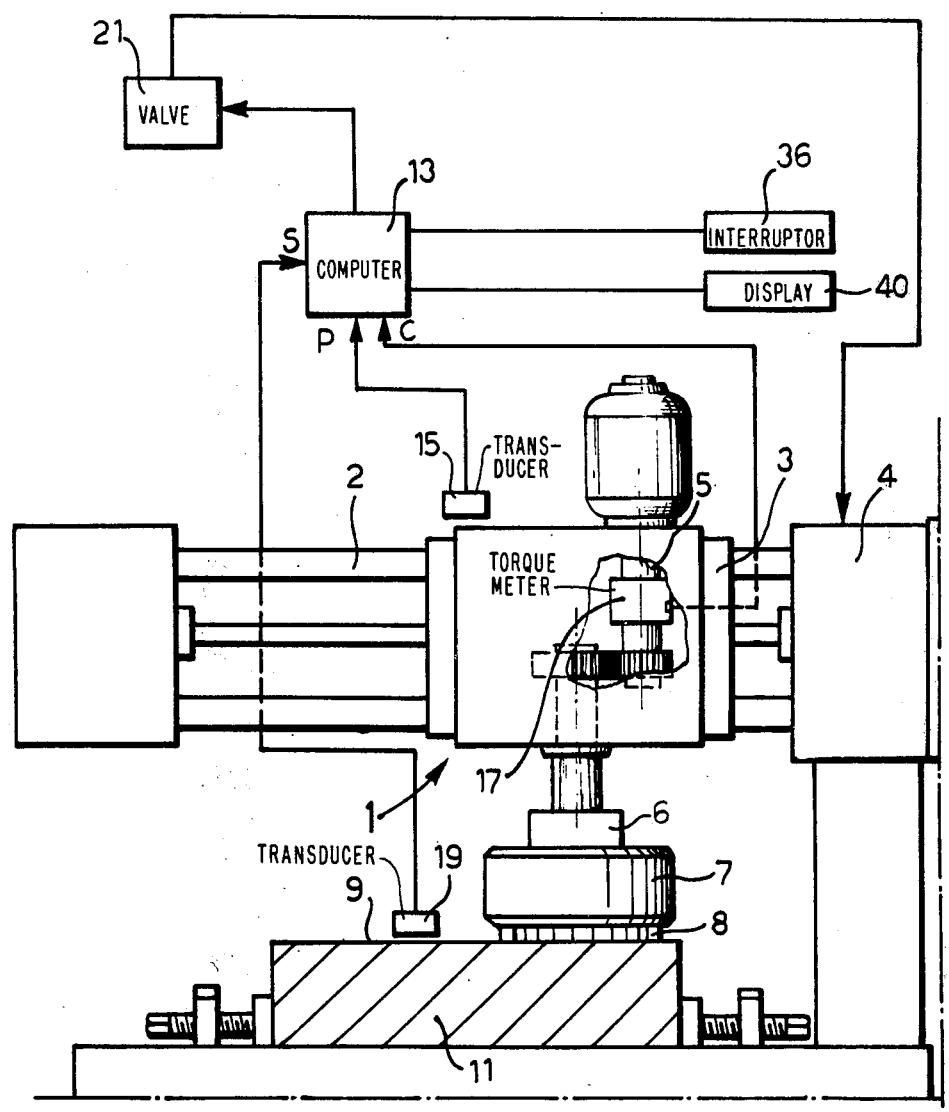
FIG. 1 represents schematically a machine tool controlled by a method according to the invention.

Referring first to FIG. 1 there is shown a machine tool 1 comprising a guide 2 along which a slide 3 is movable. Movement of the slide 3 is controlled by means of an hydraulic actuator device 4. The slide 3 supports a head 5 having drive means for rotating a chuck 6 which carries a milling tool 7 having cutting teeth 8 which act upon the surface 9 of a metal workpiece 11 to be machined. In the illustrated example the workpiece 11 to be machined is an engine block having a surface 9 to be milled.

The operation of the machine tool 1 is controlled by an electronic computer 13. The computer 13 processes an input signal P representative of the relative position between the workpiece 11 and the tool 7, an input signal C representing the thickness of the stock (machining allowance) to be removed from the workpiece 11.

The input signal P is supplied by a position transducer 15, for example a transducer made by HBM (Hottinger-Baldwin Messetechnik GmbH) of Darmstadt, Federal Republic of Germany, type W50TS, which is located in proximity to the slide 3 and able to detect the instantaneous position of the slide 3 relative to a reference fixed with respect to the workpiece 11.

The input signal C is supplied by a torquemeter 17, for example a torquemeter of the HBM type FN/3100 interposed in the drive transmission of the chuck 6.

The input signal S proportional to the depth of cut along the surface 9 of the workpiece 11 is supplied by a transducer 19, for example of the HBM type W10TS, placed in direct contact with the workpiece surface 9, or by a proximity pick-up arranged close to the surface 9 of the workpiece 11 and supported in the usual way by means, not shown, which allow the exploration of the whole surface 9 to be machined. The transducer 19 could be for example supported by the slide 3 itself and be placed with respect to the tool 7 in such a position as to cooperate with the surface 9 of the workpiece 11.

The electronic computer 13 provides an output controlling a servo-valve 21 adapted to control the hydraulic actuator device 4 which advances the tool 7 along the surface 9 of the workpiece 11. The valve 21 is for example a servovalve of the type T-7030 made by MOOG GmbH, of Boblingen, Federal Republic of Germany.

The computer 13 is connected to a display panel 40 upon which the operating state of the machine 1 is displayed, including auto-diagnostic displays.

The general principle by which the machine tool 1 is controlled for the cutting of a series of workpieces 11 having surfaces 9 to be machined will now be illustrated. The workpiece surfaces machined by the tool will present variable characteristics on the one hand due to variations from one workpiece to another in wear of the cutting tool, in the depth of cut and in the workpiece hardness, and on the other hand due to variations of the depth of cut, hardness and the shape of the machined surface of each individual workpiece.

The cutting speed, that is, the rotational speed of the tool 7, will be kept substantially constant, and to this aim a motor is used for rotating the tool 7 with an available power higher than that normally required, so that the motor operates in a region in which the slope of the torque-rotational speed characteristic is greater than normal. The cutting speed must not be interfered with because an optimal speed can be chosen in advance taking into account the cost of the tool and the number of workpieces to be machined, according to the well known Taylor equations.

According to the present invention the feed speed is controlled so as to optimize, according to choice, either the cutting time or the cost of the machining operation.

Figure 2:
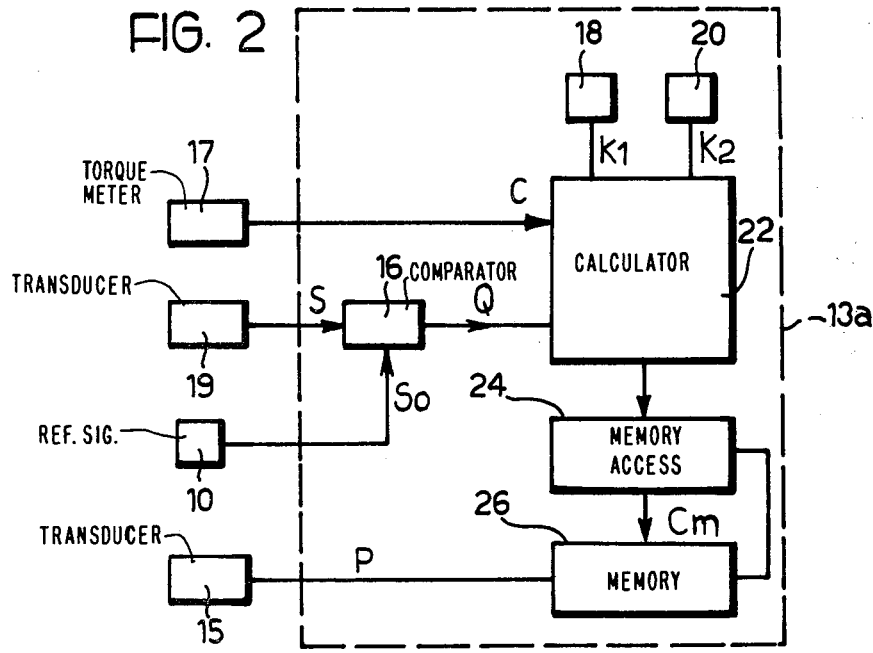
FIG. 2 is a block schematic diagram of a device for controlling the operation of the machine tool shown in FIG. 1 during a preliminary teaching mode of the process according to the invention.

The adaptive control of the machining process takes place in two successive modes: a preliminary programming or teaching mode carried out on at least one sample workpiece 11, and a second adaptive cutting mode in which controlled machining is carried out on each of the workpieces of a batch or series. The program running on the electronic computer 13 is formed by two sections 13a and 13b shown in broken outline in FIG. 2 and in FIG. 3, controlling respectively the teaching and adaptive cutting modes.

The section 13a comprises a comparator 16 which receives as one input the signal S provided by the transducer 19 and as a second input a signal $S_o$ provided by a reference signal source 10. The reference signal $S_o$ is preselected by external control of the source 10 to indicate the depth of cut along the workpiece surface 9 to be machined, that is, the thickness of metal stock which has to be removed. The comparator 16 provides an output signal Q obtained by calculating the ratio between the signal S and the reference signal $S_o$. The signal Q and the signal C provided by the torquemeter 17 are applied as respective inputs to calculating means 22 which also receive two input signals $k_1$ and $k_2$ provided by respective external sources 18 and 20 respectively.

The signal $k_1$ is a constant which is predetermined according to the technological characteristics of the tools, the material of the workpiece to be machined and the cutting conditions, for example, cooling and lubrication. In practice, convenient values of the constant $k_1$ range from about 0.45 to about 1: for example, for machining spheroidal cast iron a value of $k_1=0.65$ would be adopted.

The signal $k_2$ is a constant which is predetermined as a function of the number of teeth 8 of the milling tool 7 or more generally as a function of the number of cutting edges of the tool. In practice, the convenient values of the constant $k_2$ vary from about 1 in the case of single cutting edged tool, such as a turning or lathe tool to about 120 in the case of a grinding wheel, that is, a tool having a virtually infinite number of cutting edges.

The calculating means 22 raise the power of the signal C by an exponent $k_1$, the resultant being multiplied by factors corresponding to the signals Q and $k_2$. The calculating means 22 thus supplies an output signal C the magnitude of which is $C^{k_1} \cdot k_2 \cdot Q$. This output signal C is applied to memory access means 24 through which the signal is fed into a memory 26 which in turn is piloted by the output signal P supplied by the position transducer 15. The memory 26 therefore stores the progressive variation of the signal C as a function of the relative position of the workpiece 11 and the tool 7. The signal C will be stored in the memory 26 by sampling a discrete number of signals C. The number of samples will depend on the storage capacity of the memory 26. In the illustrated embodiment the access means 24 cooperating with the memory 26 extract the mean value of two successive signals sampled, the mean value Cm so obtained being stored in the memory 26.

Figure 3:
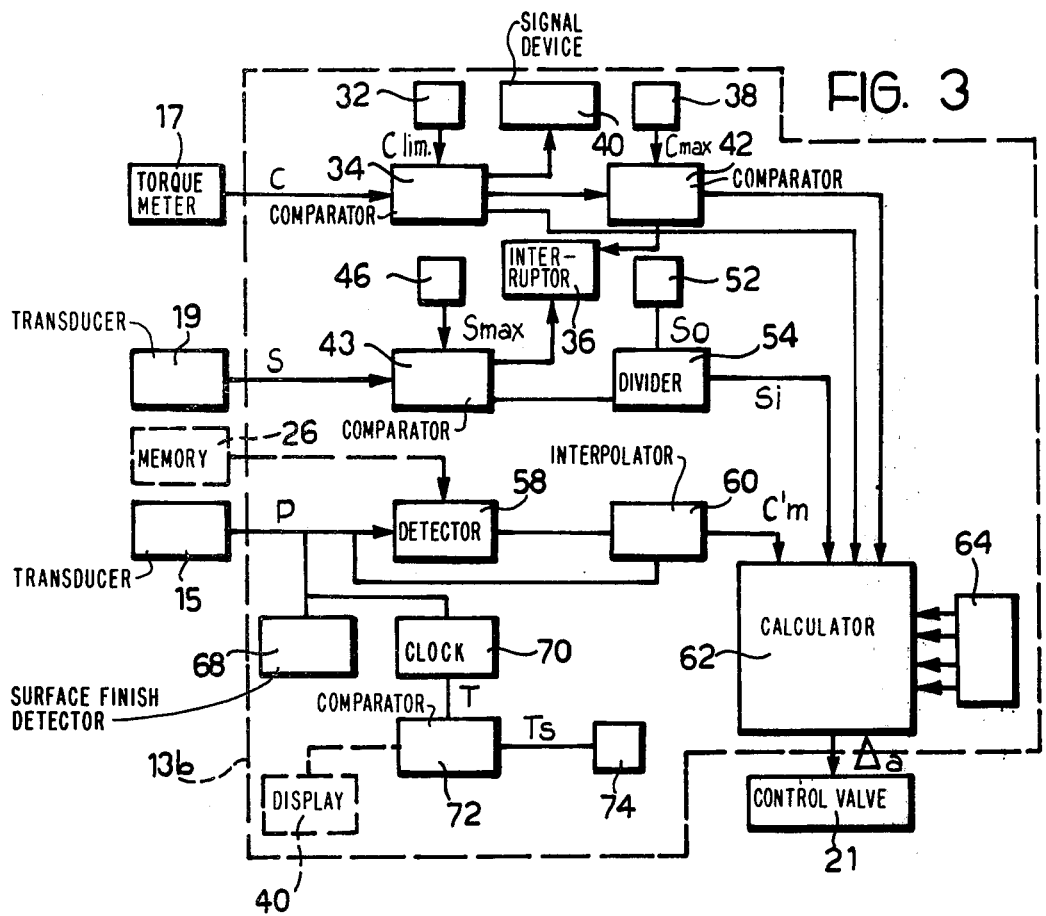
FIG. 3 is a block schematic diagram of a device for controlling the operation of the machine tool of FIG. 1 during a second cutting mode of the process according to the invention.

The structure of the second section 13b of the computer 13 will now be described with reference to the block schematic FIG. 3. The signal C provided by the torquemeter 17 is applied to a first comparator 34 which compares it with a signal $C_{lim}$ provided by a source 32. The source 32 is adjustable and programmed to provide a signal $C_{lim}$ representing the upper limit of the torque which can be withstood safely by the tool 7; if the value $C_{lim}$ is exceeded by the signal C the comparator 34 activates a signalling device 40 and at the same time applies to calculating means 62 a control signal for the actuator control valve 21 such as to cause the hydraulic actuator device 4 to advance the tool 7 feed speed equal to the predetermined feed speed of the tool in the teaching mode.

If the signal C is lower than $C_{lim}$ the first comparator 34 applies the signal C to a second comparator 42 which compares it with a signal $C_{max}$ provided by an external adjustable source 38: if the signal C exceeds the value $C_{max}$, the comparator 42 activates an interruptor device 36 which interrupts the power supply to the machine tool 1, placing it in an "emergency" condition. The operator preselects the level of the signal $C_{max}$ by adjustment of the source 38 so as to protect the torquemeter 17 against overload. The output of the comparator 42, indicated by $C_1$, is applied to the calculating means 62.

The signal S provided by the transducer 19 is applied to a third comparator 43 which compares it with a limit signal $S_{max}$ provided by an external source 46. The source 46 is adjusted so that the signal $S_{max}$ represents the upper limit of the thickness of the machining allowance which the tool 7 is able to remove. If the signal S exceeds the level of the signal $S_{max}$ the comparator 43 activates the interruptor device 36; otherwise, the comparator 43 applies the signal S to a divider 54. The divider 54 divides the signal S by a reference signal $S_o$ supplied by an external adjustable source 52, and provides an output signal $S_i$ equal to $S/S_o$ which is applied to the calculating means 62.

The position transducer 15 applies a position signal P to detector means 58, connected to the memory 26 of the section 13a, adapted to extract from said memory the stored signal $C_m$ corresponding to the relative position between the workpiece 11 and the tool 7, indicated by the signal $P_i$. The detector means 58, piloted by the signal $P_i$, cooperates with interpolator means 60 which supplies an output reference signal $C'_m$ derived by extracting from the memory 26 two stored values and interpolating between these values.

The reference signal $C'_m$ is applied to the calculating means 62, to which a number of predetermined signals, representative of quantities $k_3$, $C_a$, $k_4$ and $k_5$, are supplied by a multisignal external source 64, these latter signals being used in the calculation carried out by the calculating means 62.

The quantity $k_3$ is a constant which is prefixed proportionally to the ratio, obtained experimentally, between the cutting force (or torque) of a new tool and the cutting force (or torque) of the same tool at the end of its useful life, that is, the limit of tool wear allowed for the cutting operation. In practice, the quantity $k_3$ is chosen so as to take into account the risk of premature wear of the tool due to the type of material to be worked: if the material is easy to work because it is homogeneous, such as a light alloy casting, a value of $k_3$ of about 1.5 would be adopted, while if the material is difficult to work because of small inhomogeneities such as blowholes and hard spots, for example a cast iron workpiece containing cementite and particles of foundry dust, it is better not to risk exceeding a value of $k_3$ of about 1.3.

The quantity $C_a$ is a constant representing a value of the additive torque which serves to increase the lower values of working torque. In practice, a value of $C_a$ is chosen of the order of 0.10 times the maximum value which $C'_m$ can assume along the surface being machined.

The quantity $k_4$ is a corrective constant which is predetermined so as to optimize the rate of response of the system, that is, so that the control of the feed speed of the tool is effected with a critical damping to achieve the most precise possible tracking, with minimal delay and without instability. In practice, convenient values of the constant $k_4$ are between about 0.1 for machine tools with slides of low inertia and low friction to about 10 for machine tools with slides of high inertia and high friction. A common value for the quantity $k_4$ is 1.

The quantity $k_5$ is a constant which is predetermined according to the same criteria as the constant $k_1$. Convenient values of the constant $k_5$ vary in practice from about 0.45 to about 1. For the machining of a cast iron cylinder block it has been found that a suitable value of $k_5$ is 0.964.

The calculating means 62 multiplies the value of the reference torque $C'_m$ by the constant $k_3$, adds to the result the quantity $C_a$ and multiplies this result by the quantity $S_i$. The quantity so obtained, indicated by $C_c$ and referred to as the comparison torque, is given therefore by the equation.

$$C_c = [C'_m \cdot k_3 + C_a] \cdot S_i$$

The calculating means 62 supplies an output signal $\Delta a$ obtained by raising to the exponent $k_5$ the ratio obtained by dividing the difference between the quantity $C_i$ minus the quantity $C_c$, by the product of the quantity $k_4$ and the quantity $C_i$. Thus the output signal $\Delta a$ is given by:

$$\Delta a = \left( \frac{C_c - C_i}{k_4 \cdot C_i} \right)^{k_5}$$

The presence of the exponent $k_5$ allows the tool to be controlled so as to advance in dependence upon the cutting forces (or torques), with an exponential dependency close to that which has been obtained experimentally, linking such forces (or torques) to the feed speed. The said exponent $k_5$ is, however, adopted using the same criteria referred to above.

The signal $\Delta a$ is applied to the actuator control valve 21 to control the advance of the tool 7 by means of the hydraulic actuator device 4.

During each adaptive cutting mode carried out on each workpiece of a batch or series, the position transducer 15 applies the position signal P to a surface finish end detector 68 which in cooperation with a clock 70 supplies to a comparator 72 a signal T proportional to the time required for one complete machining cycle carried out on the workpiece 11. The comparator 72 compares said signal T with a reference signal $T_s$ supplied by an external source 74, representing a prefixed time, to activate a signalling device on the panel 40, if the measured time T is greater than the prefixed time.

The process for the control of workpiece cutting by the machine tool comprises a preliminary teaching or programming mode carried out on one or more sample workpieces followed by an adaptive cutting mode in which each of the workpieces of a batch or series is machined.

In the preliminary teaching mode one or more sample workpieces 11 are subjected to the machine tool 1 which is operated with a constant speed of advance of the slide 3. The tool 7 machines the surface 9, advancing over the surface with a constant speed. Instant by instant the signal C supplied by the torquemeter 17, proportional to the torque transmitted to the tool 7, is related to the signal Q so as to store in the memory 26 the mean signal $C_m$, as a function of the relative position between the sample workpiece and the tool.

Figure 4:
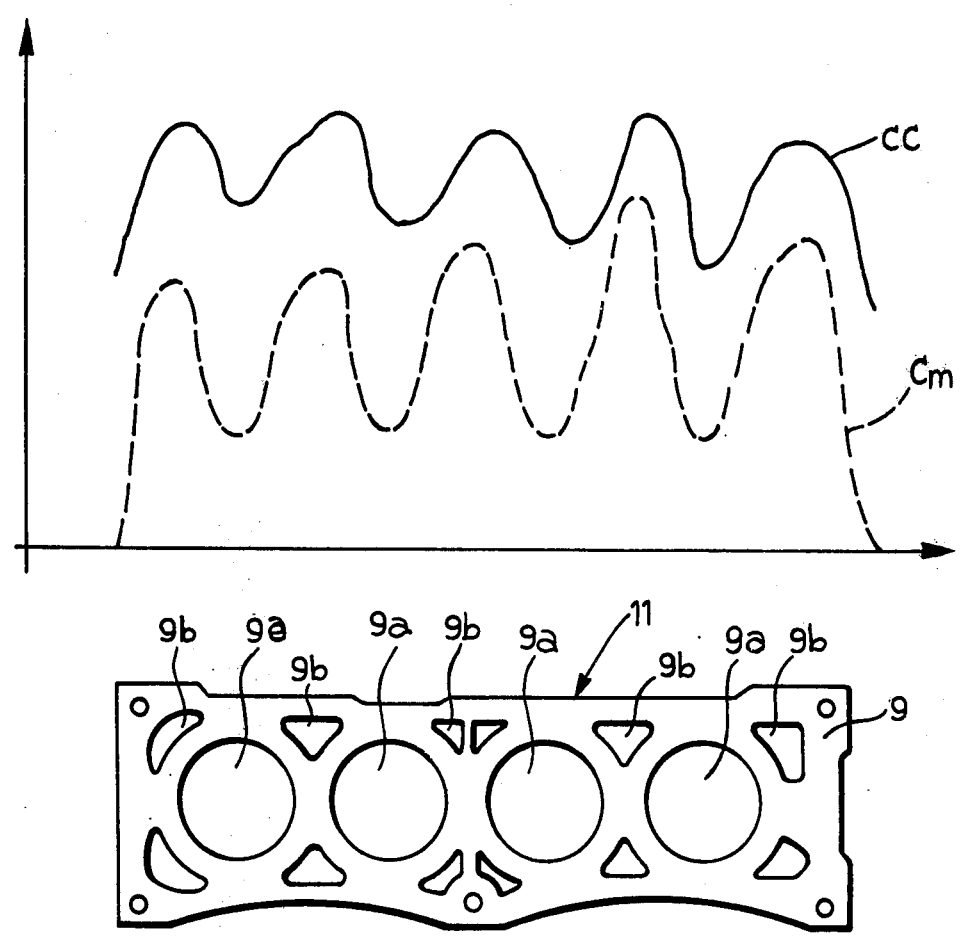
FIG. 4 illustrates graphically the variation of the cutting force or cutting torques of a cutting tool of a machine tool relative to a part being machined, illustrated diagrammatically in plan.

FIG. 4 illustrates with a dotted line the behaviour of the mean signal $C_m$ (ordinate) as a function of position along the surface 9 of the workpiece 11 (abscissa), shown diagrammatically in plan beneath the graphical representation, comprising a cylinder block of an internal combustion engine. It will be seen that in the areas in which the bores 9a of the cylinders and the cooling ducts 9b are located the value of $C_m$ undergoes considerable variations, with accentuated minima.

In the subsequent cutting mode for each workpiece of a batch or series the signal $C_m$ stored in the teaching mode is extracted in correspondence with the effective positions assumed at each instant by the tool 7, and utilized to generate the reference signal $C'_m$. The calculating means 62 generates a comparison torque signal $C_c$ as previously described. The full curve in FIG. 5 illustrates the behaviour of the comparison torque signal $C_c$, still referred to the surface 9 of the workpiece 11 being machined. The signals $C_c$ and $C_i$ are processed in such a way as to generate the signal $\Delta a$ which controls the feed speed of the tool 7 so as to conform to the condition $$\Delta a = \left( \frac{C_c - C_i}{k_4 \cdot C_i} \right)^{k_5}$$

previously referred to.

Summing up, in the course of machining, there will be more than one variation in the area being machined at any given time. Thus in the case illustrated in which the workpiece being machined is an engine block these variations occur in the areas corresponding with the bores of the cylinders 9a and with the cooling ducts 9b: discrete values of the cutting torque, representing the behaviour of the cutting forces, are stored in the memory 26. This total of values is then successively compared, in the adaptive cutting mode, with the signals C provided by the torquemeter 17.

The computer 13 illustrated can be embodied in analog or digital form.

Digital embodiments can advantageously be used and in such a case the analog signals provided by the transducers 17, 19 and 15, after amplification by relative amplifiers, are converted into digital signals which can be processed by a computer. These digital signals are applied to the computer 13, which can, for example be a PDP8/E made by Digital Equipment Corporation, Maynard, Mass. The computer is programmed in such a way so that the signals succeed each other according to a predetermined sequence. At the output of the PDP8/E computer a digital-to-analog converter is connected and controls the hydraulic actuator device 4, through the control valve 21, to control the feed speed of the tool 7. A display panel 40 is also associated with the computer 13 for displaying the operating state of the machine tool 1. The panel 40 displays the results of economic calculations, in particular the conditions for machining with a cutting force at the operating limit and the emergency stop.

FIG. 5 shows schematically the logical flow diagram of an example of a program of calculation for the PDP8/E computer. A indicates a part of program relative to the teaching mode. This mode comprises a start program operation indicated 100, an operation 101 for the introduction of parameters and an operation 102 of storing signals in the memory.

B indicates the adaptive cutting mode on each workpiece of the series. 103 indicates the start operation pf the cycle of normal machining, followed by the operatin 104 of reading the machining allowance. If the measured depth of cut does not correspond to the nominal depth of cut the torque-position values previously stored in operation 102 are modified in operation 105. This modification is carried out for a number of relative positions between the tool 7 and workpiece 11, depending on the capacity of the memory of the computer used. In the illustrated process according to this invention torque readings were carried out for 500 positions of the tool. During machining a comparison operation 106 takes place successively for each position, with the maximum permitted torque, to cause an emergency shut-off 116 in the event of excessive torque, with interruption of the advance of the slide 3. The comparison between the values of the reference torque and the torque read by the torquemeter 17 allows computation of the correction of the feed speed of the tool necessary to reduce the difference between these two torques by a requisite amount.

Following the comparison operation 106 there is an operation 107 for detecting when the machining of the workpiece is finished. If the machining is not finished the computation of the new rate of advance 108 and the modification of the feed speed 109 take place respectively followed by a repetition of the operation 105.

Upon finishing the machining one proceeds with the economical calculations, that is, with the operation 110 which determines whether the time employed by the effective machining cycle is less than the predetermined time Ts; in the negative case an operation 111 takes place causing a signal to appear on the display panel 40, while in the positive case no signal is provided on the panel 40 and an economical calculation process 112 takes place, for example to determine particular conditions for production at minimum cost or of maximum productivity. For each of these two conditions a corresponding signal is displayed on the display panel 40 so that the operator can judge whether or not to change the tool; this last operation is indicated by 113 and its output operation is either to provide a signal 114, indicating the need for tool change, or, through the return loop 115, to restart the calculation process 112.

Many other practical embodiments of the invention can be carried out, by variation of details herein described, without departing from the scope of the present invention.

What is claimed is:

1. Process for control of the cutting, by means of a machine tool, of a series of workpieces having surfaces of different characteristics to be machined by variation of the feed speed of a cutting tool of the machine tool, comprising a teaching mode carried out on at least one sample workpiece, follwed by an adaptive cutting mode, carried out on each of the workpieces of the series, wherein the teaching mode comprises the operations of:
   (a) subjecting at least one sample workpiece to cutting by means of the machine tool with the cutting tool advancing at a constant feed speed;
   (b) generating a first signal C proportional to the working torque of the cutting tool;
   (c) generating a second signal Q proportional to the depth of cut along the whole of the sample workpiece;
   (d) processing the first and second signals C, Q to provide a third signal C represented by:

$C = C^{k_1} \cdot k_2 \cdot Q,$ where $k_1$ is a constant which is predetermined according to the tehcnological characteristics of the cutting tool, the material of the workpiece to be machined and the cutting conditions, and $k_2$ is a constant which is predetermined according to the number of cutting edges of the cutting tool;
   (e) generating a fourth signal P which is a function of the relative position of sample workpiece and the cutting tool;
   (f) storing in a memory progressive values of the third signal C as a function of the relative positions of sample workpiece and the cutting tool;
   and wherein the cutting mode comprises the operations of:
   (g) generating a fifth signal $P_i$ representing the instantaneous relative position of the workpiece and the cutting tool;
   (h) extracting the third signal C, stored during the teaching mode and corresponding to the instantaneous relative position between the workpiece and the tool, and generating a sixth reference signal $C'_m$ proportional to said extracted third signal;
   (i) generating a seventh signal $S_i$ proportional to the actual depth of cut along the workpiece surface to be machined by the cutting tool;
   (j) generating an eighth signal $C_a$ having a predetermined constant value, representative of an additive value of torque;
   (k) processing the sixth signal $C'_m$, the seventh signal $S_i$ and the eighth signal $C_a$ to generate a ninth signal $C_c$ represented by:

$[C_c = C'_m \cdot k_3 + C_a] \cdot S_i,$ where $k_3$ is a predetermined constant proportional to the ratio, derived experimentally, between the cutting forces of a new tool and the cutting forces of the same tool at the end of its working life;
   (l) generating a tenth signal $C_i$ proportional to the instantaneous working torque of the cutting tool;
   (m) processing the ninth signal $C_c$ and the tenth signal $C_i$ to generate an eleventh signal $\Delta a$ represented by:

$$\Delta a = \left( \frac{C_c - C_i}{k_4 \cdot C_i} \right)^{k_5}$$

where $k_4$ is a corrective constant which is predetermined so as to optimize the response rate of the machine tool control system, and $k_5$ is a constant which is predetermined according to the technological characteristics of the cutting tools, the material of the workpieces and the cutting conditions, and
   (n) controlling the feed speed of the cutting tool by means of the said eleventh signal $\Delta a$.

2. Process as in claim 1, wherein the constant $k_1$ has a value between about 0.45 and about 1.

3. Process as in claim 1, wherein the constant $k_2$ has a value between about 1 and about 120, the lowest value being appropriate for a grinding tool having an indefinitely large number of cuttng surfaces.

4. Process as in claim 1, wherein the constant $k_3$ has a value between about 1.5 and about 1.3, the highest value being chosen for very homogeneous materials and the lowest value being chosen for very inhomogeneous materials.

5. Process as in claim 1, wherein the eighth signal $C_a$ has a value in the order of 0.10 times the maximum foreseeable value for the sixth signal $C'_m$.

6. Process as in claim 1, wherein the constant $k_4$ has a value between about 0.1 and about 10, the lowest value being chosen for machine tools with slides of low inertia and low friction and the highest value being chosen for machine tools with slides of high inertia and high friction.

7. Process as in claim 1, wherein the constant $k_5$ has a value between about 0.45 and about 1.

8. Process as in claim 1, wherein in the teaching mode the operation (f) of storing the third signal C as a function of the relative position signal P takes place by sampling a number of said third signals C and deriving the mean value $C_m$ between each pair of successive said third signals C and storing the mean values $C_m$, and in the subsequent adaptive cutting mode (h) the sixth signal $C'_m$ is generated by extracting from the memory the mean values $C_m$ and interpolating between each two successive mean values $C_m$ the sixth signal $C'_m$ resulting from such interpolation.

* * * * *